US005700506A

United States Patent [19]

Mudahar

[11] Patent Number: 5,700,506
[45] Date of Patent: Dec. 23, 1997

[54] METHOD FOR PROLONGING THE SHELF LIFE OF FRESH TOMATO PIECES

[75] Inventor: Gurmail Mudahar, Hayward, Calif.

[73] Assignee: DNA Plant Technology Corporation, Oakland, Calif.

[21] Appl. No.: 549,344

[22] Filed: Oct. 27, 1995

[51] Int. Cl.$^6$ .............. A23B 4/027; B65B 55/00
[52] U.S. Cl. .............. 426/316; 426/318; 426/324; 426/326; 426/418; 426/532; 426/615
[58] Field of Search .............. 426/615, 316, 426/318, 324, 326, 532, 418

[56] References Cited

U.S. PATENT DOCUMENTS 4,883,674  11/1989  Fan .............. 426/324

FOREIGN PATENT DOCUMENTS 5316943  12/1993  Japan .............. 426/324

OTHER PUBLICATIONS

Kertsesz, Z. 1938, The Canner. vol. 88, #7, p. 26.
Adams, et al., Factors affecting the efficacy of washing procedures used in the production of prepared salads, *Food Microbiology* 6:69–77 (1989); p. 71, second col.
Frazier, W.C. and Westhoff, D.C., Food Microbiology 4th Ed., Chapter 7: *Preservation by use of low temperatures*, p. 125.
Zagory, D. and Kader, A.A., Quality Factors of Fruits and Vegetables: Chemistry and Technology, J.Jen, ed., Chapter 14: *Quality Maintenance in Fresh Fruits and Vegetables by Controlled Atmospheres*, entire article.

*Primary Examiner*—Helen Pratt
*Attorney, Agent, or Firm*—Townsend and Townsend and Crew LLP

[57] ABSTRACT

A method by which the shelf life of fresh tomato pieces can be substantially increased is provided. According to the method, cored fresh tomatoes are contacted with a chlorine solution, cut into pieces, contacted with an aqueous solution of a calcium salt, and packaged in a container having a gas permeability of about 90 to about 160 cc of oxygen/100 square inch/day. The packaging is carried such that the residual oxygen level in the container after sealing is between about 2% and about 10%. In a preferred embodiment, the processing steps are carried out at an ambient temperature of between about 34° F. and about 50° F.

1 Claim, No Drawings

METHOD FOR PROLONGING THE SHELF LIFE OF FRESH TOMATO PIECES

BACKGROUND OF THE INVENTION

The discovery of new methods for increasing the useful shelf life of food products is the focus of considerable attention by food producers in general, and is particularly important for producers of packaged fresh cut vegetables and salad ingredients. Within the next five years, the U.S. market for packaged fresh cut vegetables is estimated to reach $1 billion and the market for salad mix is likely to reach $7 billion. Increased shelf life for these products will increase sales and consumer satisfaction, and decrease waste due to spoilage.

Although methods are known for increasing the shelf life of many fresh fruits and vegetables, increasing the shelf life of fresh cut tomatoes so that they may be packaged for use by restaurants, food service outlets, and consumers has proved difficult. Tomatoes are extremely perishable commodities and their shelf life is particularly short after they are cut into pieces, as is usually done before they are consumed. It is an object of the present invention to provide new methods for increasing the shelf life of fresh tomato pieces.

The shelf life of fresh fruits and vegetables is affected by the quality of the raw material, post-harvesting handling conditions, processing conditions, the packaging system, and storage and distribution. Certain steps are commonly taken to attempt to increase the shelf life of fresh cut vegetables and salad mix. For example, these food products are usually stored under refrigeration. However, even when stored under refrigeration, the growth of microflora such as bacteria, yeast and mold in fresh tomato pieces will adversely affect the organoleptic qualities of the vegetable within a short time (i.e., about 2–3 days). Moreover, the unique texture of cut tomatoes deteriorates rapidly.

Food producers also attempt to choose packaging conditions and materials that will maximize shelf life. For example, a modified (e.g., low oxygen) atmosphere within the package may be used to decrease the rate of product deterioration (e.g., by oxidation). See, Sanburn, M.S., *Modified Atmosphere Packaging of Fresh Pre-Prepared Vegetables*, in *Proceedings of the Sixth International Conference on Controlled/Modified Atmosphere Packaging* (Schotland Business Research Inc., 1991). Because each fruit or vegetable has its own characteristic respiratory rate, the appropriate modified atmosphere equilibrium differs for each product. In addition, because packaging materials differ in permeability to atmospheric and respiratory gases, the choice of packaging materials can affect shelf life. Thus, both the appropriate packaging film and the gas mixture within the packaging affect shelf life in a product-specific manner.

While the art has provided several methods to extend the shelf life of vegetables or fruits, none of these has proved suitable for significantly extending the shelf life of cut tomatoes while retaining texture and organoleptic qualities characteristic of fresh tomatoes. Thus, a need exists to discover and develop such methods.

SUMMARY OF THE INVENTION

A method for preparing packaged fresh tomato pieces with increased shelf life is provided. According to the method, a cored fresh tomato is contacted with between about 60 and about 120 parts per million chlorine, preferably for between about 30 seconds and 120 seconds, to minimize surface contamination by microbes (e.g., molds, yeast, and bacteria). The tomato is then cut (e.g., sliced or diced) and the resulting pieces are contacted with an aqueous solution of a calcium salt, such as calcium chloride. In a preferred embodiment, each of these steps is carried out at a temperature of between about 34° F. and about 50° F. The treated tomato pieces are then packaged in a container that has a gas permeability of between about 90 and about 160 cc of oxygen/100 square inch/day (measured at one atmosphere pressure and 73° F.). The container is sealed in the presence of nitrogen gas wherein the residual oxygen level is at a level of between about 2% and about 10%. The packaged tomato pieces prepared according to this method will have a shelf life of about 7 to 14 days when stored at 40° F.

DESCRIPTION OF THE PREFERRED EMBODIMENT

The invention relates to raw fresh cut tomato prepared as ready to use food and provided in a package. The tomato pieces may be stored for a period substantially longer than raw fresh cut tomatoes which have not been treated by the process of the present invention. Tomato pieces provided in this fashion are ideal for food service outlets since they require no preparation and can be used directly from the package. Tomato pieces processed according to the invention have an increased shelf life so that when eaten, they provide substantially the same sensory qualities of appearance, odor and taste as freshly harvested and cut raw tomatoes.

Tomatoes

The methods of the present invention are suitable for virtually all edible tomatoes, hybrid or inbred, in particular fresh market (as opposed to processing) tomatoes, e.g., those that are eaten in the raw state. Tomatoes which are well adapted to the process of the present invention include large-fruited tomatoes (e.g., Beefsteak type) as well as Pear, Roma, and Cherry tomatoes. Beefsteak tomatoes are particularly preferred because of their large size and high yield. Commercial varieties such as Meran, Tissot, Mirinda, Celtics, FWF 92205 (DNA Plant Technology, Oakland, Calif.: hereinafter "DNAP"), FWF 91389 (DNAP) and FWF 92039 (DNAP) are particularly suitable tomatoes. For listings of other suitable tomatoes see, Rick, in *Evolution of Crop Plants*, N.W. Simmonds, ed., pp. 268–273 (Longman, London, 1976), and Taylor in *The Tomato Crop*, pp. 1–35 (Chapman and Hall, London, 1986). Those of skill will recognize that the present invention can be used advantageously with tomatoes that have been bred or genetically engineered to have increased shelf life or other qualities.

Tomatoes of all maturities from pink to red ripe can be preserved in accordance with this invention, however light red tomatoes are preferred for longer shelf life. Tomato fruit color can be determined as described, for instance, in Gull et al., *J. Amer. Soc. Hort. Sci.* 114:950–954 (1989) and Kader et al., *Hort. Sci.* 13:577–578 (1978).

Prior to use in the present invention, the stems of the harvested tomatoes are preferably removed and the tomatoes are preferably cored. Stem removal and coring may be carried out according to standard techniques well known to those of skill in the art.

Temperature

Because many of the microorganisms that cause spoilage of tomatoes grow well at moderately high temperatures (i.e., temperatures greater than 50° F.) the environment, particularly the temperature, in which the tomatoes are processed is important. While reduced temperatures will tend to minimize microbial growth, temperatures below about 34° F. will have a detrimental effect on texture. Thus to minimize microbial contamination, maintain an acceptable texture, and increase the shelf life of the product in accordance with the present invention, the ambient temperature (i.e., the temperature of the processing room and of solutions that contact the tomatoes or tomato pieces) is preferably between about 34°–50° F., more preferably between about 38°–42° F. As used herein, the term "ambient temperature" refers to both the air temperature and the temperature of the solutions (e.g., chlorine and calcium solutions). The tomatoes are preferably kept cold from processing to sale; that is, the tomatoes/tomato pieces should be stored and transported at between about 34° F. and 50° F., preferably between about 38° F. and about 42° F.

Treatment with chlorine

Prior to cutting the tomato into pieces, the tomato is contacted (i.e., washed) with an aqueous chorine solution to minimize microbial contamination on the surface. The chorine solution used may be made from a variety of starting materials such as sodium hypochlorite, potassium hypochlorite, and the equivalent.

The concentration of chlorine in the solution should be between about 60 and about 120 pans-per-million (ppm), with between about 80 and about 100 ppm preferred. (As used herein, all ranges of temperature or concentration are inclusive.) Contacting typically is done by dipping the tomato into the aqueous solution, but may be carried out by other suitable means, such as by spraying. When the tomato is dipped into the chlorine solution, a minimum of 30 seconds contact time is typically preferred. In general, a contact time of between 30 seconds and 120 seconds is adequate. The treatment with the chorine solution should be adequate to result in a microbial load of less than 1,000,000 cfu/gram. Microbial load may be determined using standard assays, including, for example, standard plate count assays (e.g., as described in the FDA *Bacteriological Analytical manual*, 7th Ed. 1992, AOAC, Arlington Va. 22201.)

Cutting Step

It is the object of this invention to provide ready-to-use cut tomatoes for use by restaurants, food services, and consumers. The size and shape of the tomato pieces will vary according to the specific use of the product. Typically, however, the tomatoes will be cut into slices, usually slices of about 1/16–1/8 inch in thickness, or into cubes, usually about 1/4–1/2 inches on a side. Cutting into cubes is also referred to as "dicing". As used herein, the term "cutting" includes dicing, cutting into slices (i.e., cross sections), halves, wedges, or other shapes.

Although cutting may be carried out by hand, it will usually be done mechanically. A number of mechanical slicers and dicers are commercially available. For example, slicing may be done using the "Tomato Witch" mechanical slicer (Prince Castle Inc., Carol Stream Ill.). Dicing may be carried out, for example, using a mechanical dicer available from Minuteman Trading, Millwood, Va.

Calcium treatment

Generally, untreated tomato pieces lose their textural integrity within a day after cutting. According to the present method, the texture of the tomato pieces is maintained by treating the pieces with an aqueous solution of a calcium salt. Calcium is believed to cause formation of cross bridges between naturally present pectin molecules of tomatoes, and results in improved texture of the cut tomatoes. With respect to calcium treatment in general, see Mudahar, G.S., and Jem, J.J., (1991) *Texture of Raw and Canned Jicama (Pachyrrhizus tuberosus) and Chinese Water Chestnut (Eleocharis dulcis)*, Journal of Food Science 56:4, 977–980.

Various calcium salts including calcium chloride, calcium carbonate, calcium titrate, calcium phosphate, and calcium oxide may be used for the calcium treatment, with calcium chloride most preferred. A suitable calcium salt is one that does not significantly affect the taste of the tomato by altering its pH.

The concentration of the calcium salt will typically be between about 0.1% and about 1% (w/v), with a concentration of between about 0.3% and about 0.5% preferred, and about 0.4% most preferred. Lower calcium concentrations will tend to be less effective in preserving texture, while higher concentrations may impart bitter taste and off flavor to the product.

The calcium salt may be sprayed on the surface of tomato pieces. It is also possible to apply the solution by other means, such as by dipping the tomato pieces into the solution. Spraying or dipping may be done over a period of from several seconds to several minutes.

As is noted above, the temperature at which the tomato processing takes place is important in minimizing the growth of spoilage organisms. Thus, the temperature of the calcium solution should be between about 34° F. and about 50° F., with between about 38° F. and about 42° F. preferred, and about 40° F. most preferred.

Packaging

Following calcium treatment, the tomato pieces are packaged in a plastic container. The configuration of the container may vary, so that the tomato pieces may, for example, be placed directly in a plastic bag, in a rigid plastic container, on a tray wrapped in plastic, on a tray placed in a bag, etc. Whatever configuration is used, the packaging material that forms a barrier between the tomato pieces and the external environment should prevent undue moisture loss and microbial contamination, and have a gas permeability effective to permit sufficient respiration for maintaining the tomato tissue in a viable (i.e., respiring) condition. Use of a tray has the advantage of ease of handling and reduced danger of physical damage. Trays may be made from plastic (e.g., polystyrene), styrofoam, aluminum, fiberboard, or other materials.

Moisture loss

The moisture loss through the package should be less than 2% in 14 days of storage, in order to maintain the gel integrity of the tomato pieces. As used in the art, "gel" refers to the liquid portion of the tomato. Loss of moisture (or damage during processing) can cause the gel to break down, resulting in holes in tomato slices.

Microbial contamination

The package should provide a barrier to external microbes. The microbial level on the product in the package should remain less than 1,000,000 cfu/gm during the storage period.

Permeability

The package material should have a gas permeability effective to permit sufficient respiration for maintaining the tomato tissue in a viable condition. Useful packaging materials have a gas permeability of between about 90 to about 160 cc of oxygen/100 in.$^2$/day when measured at one atmosphere pressure and 73° F., with between about 120 and about 140 cc of oxygen/100 in.$^2$/day preferred.

The packaging material will typically be composed of plastic. Packaging may be a monolayer film, a laminate, or a coextruded film (see, *Putting Produce in the Right Bag, Fresh Cut Magazine*, November/December 1994). A preferred packaging material is a laminate film structure such as Superlam 0 (James River Corp., 2101 Williams St., San Leandro, Calif. 94577). This material is a 2.25 mil laminate film with three layers: an Oriental polypropylene (OPP) layer, a low density polyethylene (LDPE) layer, and an ethylene vinyl acetate (EVA) layer.

Other monolayer and laminate film structures with similar oxygen transmission rates are available from several companies such as Cypress Packaging (1525 Brooks Ave., Rochester, N.Y. 14624), Sidlaw Packaging (UK), and Curwood (A. Bemis Co., 220 Badger Ave., P.O. Box 2968, Oshkosh, Wis. 54903).

Other factors

In addition to the factors discussed above, one of skill will recognize that other package characteristics will be desirable, such as film machinability and a $CO_2$ transmission (out) rate equal to, or greater than, the oxygen transmission (in) rate.

Nitrogen flushing

According to the present invention, the plastic container is sealed in the presence of nitrogen such that the residual oxygen level is between about 2% and about 10%, preferably between about 4% and about 5%. The use of this modified atmosphere packaging minimizes oxidative reactions and suppresses the respiration rate of the tomato pieces resulting in longer shelf life.

The oxygen in the package may be displaced by nitrogen ("nitrogen flushing") and the package sealed by a variety of means, e.g., using a vacuum/gas seal. This can be carried out, for instance, using a PAC vacuum/impulse sealer (Packaging Aids Corp. Model Series PV, San Rafael Calif. 94912), a vacuum/gas sealer (CVP systems, 2518 Wisconsin Ave., Downers Grove Ill. 60515), or a Form/Fill/Seal machine (Hayssen, Sheboygan, Wis. 53082-0571).

Storage

For maximum shelf life, the packages of tomato product should be maintained under refrigeration at a temperature of between about 34° F. and about 50° F., preferably between about 38° and about 42° F. Packaged tomato pieces prepared in accordance with this process will be expected to have a shelf life of about 7-14 days when stored at 40° F. and about 6-10 days at 50° F.

Determination of shelf life

The useful shelf life of tomato pieces can be determined by (i) assessing the level of microbial contamination, which preferably is below 1,000,000 cfu/gram (i.e., log 6 cfu/gm) although higher levels may be acceptable, and (ii) assessing the sensory attributes (e.g., flavor, firmness, juiciness and overall acceptability) of the fruit. Sensory attributes may be determined by descriptive analysis on a nine point hedonic scale in which: 1=Dislike Extremely; 2=Dislike Very Much; 3=Dislike Moderately; 4=Dislike Slightly; 5=Neither like nor dislike; 6=Like Slightly; 7=Like Moderately; 8=Like very much; and 9=Like extremely. Sensory tests are preferably carried out by a panel of judges trained to identify the level of various sensory attributes (see, Meilgaard, Civille, and Carr, *Sensory Evaluation* 2nd Ed., CRC Press, Inc. 1991, which is expressly incorporated herein by reference.) A fresh tomato piece will preferably have an overall acceptability score of 5 to 9. A score of about 5 is marginally acceptable. In overall acceptability score of less than 5 indicates that a packaged tomato piece is unacceptable, i.e, that its shelf life has been exceeded.

EXAMPLES

Example 1

About 50 pounds light red to fully red tomatoes (DNAP variety FWF 92205) of 6×6 size were harvested and the stems removed in the field. 92205 is a hybrid with a long shelf life, crimson color (gene) and large fruit. The tomatoes were cored using a coring knife and washed using a chlorine solution (100 ppm in water). About 25 pounds of these tomatoes were sliced into ⅛ thick slices at room temperature using a "Tomato Witch" mechanical slicer (Prince Castle Inc., Carol Stream Ill.). The remaining 25 pounds were diced into +e.fra 1/4–½" cubes by a mechanical dicer from Minuteman Trading, Millwood, Va.

The tomato dices and slices were sprayed with a calcium chloride solution (0.4%) at 39° F. for several minutes, resulting in a 1–2% increase in weight of the cut tomato pieces (i.e, the 1–2% increase in tomato weight was the result of calcium chloride solution retained by the dices and slices). After spraying with the calcium chloride solution, the dices were packed in 8.5"×5.5"×1.5" size plastic trays with approximately 10 ounces of dices or slices per tray. Each tomato-laden tray was then placed in a 10.5"×6.5" size bag made from Superlam-O film (James Rivers). The oxygen transmission rate of this film is 120–140 cc/100 in.$^2$/day.

The packages, i.e., the bags containing the trays, were flushed with nitrogen gas to 7% residual oxygen in the package using a vacuum/gas cycle from Packaging Aids Corporation, San Francisco. The vacuum was drawn and nitrogen gas was flushed in the packages by two nozzles attached to the sealer. The packages were then sealed using a PAC vacuum/impulse sealer. Oxygen and carbon dioxide concentrations in the packages were confirmed by analyzing on a 5890A Gas Chromatograph (Hewlett Packard). The carbon dioxide concentration in the packages was about 0% at the time of sealing.

Ten packages of diced and sixteen packages of sliced tomatoes were stored at 40° F. The products were tested for headspace gases (oxygen and carbon dioxide), microbiology (aerobic plate count, yeast and mold) and sensory qualities (tomato flavor, firmness, juiciness and overall acceptability) at 0, 7, 10 and 14 days of storage. The sensory evaluation was conducted by a trained sensory panel with results reported on a 9 point hedonic scale. The results of these tests are presented in Table 1 and represent averages of three samples.

As shown in Table 1, the oxygen concentration in the packages (headspace) decreased to 4–5%, whereas carbon dioxide concentration increased to 4–5% after 14 days of storage for both dices and slices. The sensory qualities of the tomato pieces remained acceptable throughout the storage period of 14 days. Only a slight change in tomato flavor, firmness, juiciness and overall acceptability of diced and sliced tomatoes was noted after 14 days of storage. Some slices showed some increase in translucency and some loss of gel.

The yeast, mold and aerobic plate count was lower for the sliced tomatoes than for the diced tomatoes. The maximum aerobic plate count after 14 days of storage was log 6 CFU/gm in tomato dices and log 3.9 CFU/gm in sliced tomatoes. The maximum yeast and mold scores for both sliced and diced tomatoes were 4.4 and 5.8, respectively.

TABLE 1

Sensory Attributes, Microbiology and Headspace of Sliced and Diced Tomatoes Sprayed with 0.4% Calcium Chloride Solution

|  | Sliced | | | | Diced | | | |
|---|---|---|---|---|---|---|---|---|
| Days after packaging | 0 | 7 | 10 | 14 | 0 | 7 | 10 | 14 |
| Sensory Attributes* | | | | | | | | |
| Flavor* | 7 | 7 | 6.5 | 6 | 6.5 | 6 | 6 | 6 |
| Firmness** | 5 | 4 | 4 | 4 | 6 | 4 | 4 | 4 |
| Juiciness*** | 6 | 5.5 | 5 | 5 | 6 | 5.5 | 5 | 5 |
| Overall Acceptability | 7 | 7 | 7 | 6.5 | 7 | 7 | 6 | 6 |
| Microbiology | | | | | | | | |
| (log CFU/gram sample) | | | | | | | | |
| Aerobic Plate Count | 1.4 | 2.3 | 3.6 | 3.9 | 2.4 | 3.8 | 4.1 | 6.0 |
| Yeast and Mold | 0.3 | 2.2 | 3.6 | 4.4 | 2.5 | 3.5 | 3.4 | 5.8 |
| Headspace gasses | | | | | | | | |
| Oxygen (%) | 7 | 4.3 | 4.6 | 4.1 | 7 | 5.2 | 4.5 | 4.3 |
| Carbon Dioxide (%) | 0 | 4.1 | 3.9 | 4.8 | 0 | 2.9 | 4.1 | 4.4 |

*Flavor and overall acceptability are based on 9-point hedonic scale:
1 Dislike Extremely
2 Dislike Very Much
3 Dislike Moderately
4 Dislike Slightly
5 Neither like nor dislike
6 Like Slightly
7 Like Moderately
8 Like very much
9 Like extremely
**Firmness is based on a 9-point scale in which 1 = cream cheese and 9 = apple. The preferred tomato firmness is in the 4–6 range.
***Juiciness is based on a 9-point scale in which 1 = banana and 9 = orange. The preferred tomato juiciness is in the 5–7 range.

Example II

Tomatoes of other varieties, as listed in Table 2, were processed, packaged, and stored as described in Example I, and evaluated for shelf life and sensory quality. Tomato varieties FWF 91389 and FWF 92030 are hybrids with a long shelf life, crimson color (gene) and large fruit. The results are presented in Table 2.

TABLE 2

| Variety | Results |
|---|---|
| FWF 91389 | Achieved 14 day shelf life in both slice and dice forms (log 4 and 6 CFU/gram sample, respectively after 14 days). |
| FWF 92030 | Achieved 14 day shelf life in both slice and dice forms (log 4 CFU/gram sample after 14 days). |
| Roma - Storebought | Dices were marginally acceptable after 14 days (log 6 CFU/gram sample). |
| Beefsteak - Produce World Corporation | Slices and Dices were marginally acceptable after 14 days (log 6 and 8 CFU/gram sample, respectively after 14 days). |

Example III

The effect on FWF 92205 tomatoes of storage for a limited time at high temperature (50° F.) was evaluated. FWF 92205 tomatoes were processed and packaged according to Example I, and stored at 40° F. followed by 50° F. as indicated in Table 3.

TABLE 3

| Total time in storage | Storage Regime | Results |
|---|---|---|
| 14 days | 40° F. throughout 14 days of storage | Slices and Dices were acceptable for 14 days |
| 7 days | 3 days @ 40° F. + 4 days @ 50° F. | Slices and Dices were acceptable for 7 days |
| 10 days | 7 days @ 40° F. + 3 days @ 50° F. | Slices and Dices were acceptable for 10 days |
| 14 days | 10 days @ 40° F. + 4 days @ 50° F. | Slices and Dices were marginally acceptable for 14 days |

The above examples are provided to illustrate the invention, but not to limit its scope. Other variants of the invention will be readily apparent to one of ordinary skill in the art and are encompassed by the appended claims. All publications, patents, and patent applications cited herein are hereby incorporated by reference for all purposes.

What is claimed is:

1. A method for preparing packaged fresh tomato pieces with increased shelf life comprising the steps:

i) contacting a cored fresh tomato with between about 80 and about 100 parts per million chlorine for between about 30 seconds and about 120 seconds;

ii) cutting the tomato into at least two pieces, whereupon tomato pieces are produced;

iii) contacting the tomato pieces with an aqueous solution of a calcium salt, wherein the concentration of the calcium salt is about 0.4% (w/v);

iv) packaging the tomato pieces in a plastic container that has a gas permeability of between about 120 to about 140 cc of oxygen/100 square inch/day when measured at one atmosphere pressure and 73° F.; said plastic container comprising a 2.25 mil laminate film comprising three layers, said three layers comprising a first layer comprising oriental polypropylene, a second layer comprising low density polyethylene and a third layer comprising ethylene vinyl acetate; and, v) sealing the plastic container in the presence of nitrogen gas wherein the residual oxygen level in the container after sealing is between about 4% and about 5%;

wherein steps (i) through (v) are carried out at an ambient temperature of between about 38° F. and about 42° F.

* * * * *